(12) United States Patent
Farrar et al.

(10) Patent No.: US 11,137,185 B2
(45) Date of Patent: Oct. 5, 2021

(54) SYSTEM AND METHOD OF HOT GAS DEFROST CONTROL FOR MULTISTAGE CASCADE REFRIGERATION SYSTEM

(71) Applicant: Farrar Scientific Corporation, Marietta, OH (US)

(72) Inventors: David Scott Farrar, Uniondale, PA (US); James S. Vuksic, Marietta, OH (US); Trace Lydick, Athens, OH (US); Thomas Schoeppner, Marietta, OH (US); Alex Roberts, Parkersburg, WV (US)

(73) Assignee: Farrar Scientific Corporation, Marietta, OH (US)

( * ) Notice: Subject to any disclaimer, the term of this patent is extended or adjusted under 35 U.S.C. 154(b) by 75 days.

(21) Appl. No.: 16/720,607

(22) Filed: Dec. 19, 2019

(65) Prior Publication Data

US 2020/0386457 A1 Dec. 10, 2020

Related U.S. Application Data

(60) Provisional application No. 62/857,047, filed on Jun. 4, 2019.

(51) Int. Cl.
| | | |
|---|---|---|
| *F25B 47/02* | (2006.01) | |
| *F25B 41/22* | (2021.01) | |
| *F25B 41/31* | (2021.01) | |
| *F25B 7/00* | (2006.01) | |
| *F25B 40/06* | (2006.01) | |

(Continued)

(52) U.S. Cl.
CPC .............. *F25B 47/022* (2013.01); *F25B 7/00* (2013.01); *F25B 40/06* (2013.01); *F25B 41/22* (2021.01); *F25B 41/31* (2021.01); *F25B 41/347* (2021.01); *F25B 41/385* (2021.01); *F25B 2341/064* (2013.01); *F25B 2347/02* (2013.01); *F25B 2400/0403* (2013.01); *F25B 2400/061* (2013.01); *F25B 2700/191* (2013.01); *F25B 2700/2101* (2013.01)

(58) Field of Classification Search
CPC ..... F25B 7/00; F25B 47/022; F25B 2347/022
See application file for complete search history.

(56) References Cited

U.S. PATENT DOCUMENTS

| | | |
|---|---|---|
| 5,921,092 A | 7/1999 | Behr et al. |
| 6,324,856 B1 | 12/2001 | Weng |

(Continued)

*Primary Examiner* — Christopher R Zerphey
(74) *Attorney, Agent, or Firm* — Gwen R. Acker Wood; Acker Wood IP Law LLC

(57) ABSTRACT

The present invention provides a system and method for an improved multistage, cascade refrigeration system using hot gas defrost to rid the evaporator of ice build-up which accumulates over time, while the air in the evaporator enclosure remains below the freezing point of water. The present invention thus provides greater defrost flexibility with increased ease of design and implementation than current refrigeration systems, which allows for more robust hot gas defrost function for multistage refrigeration systems, such that it is unaffected by temperature changes of the condensing fluid (ambient air temperature for air cooled condensers, water temperature for water cooled condensers), and can be readily adapted to any refrigerant suitable for a selected temperature range.

20 Claims, 1 Drawing Sheet

(51) Int. Cl.
F25B 41/345 (2021.01)
F25B 41/385 (2021.01)

(56) References Cited

U.S. PATENT DOCUMENTS

| | | | |
|---|---|---|---|
| 6,405,554 B1 * | 6/2002 | Kawakatu | F25B 7/00 |
| | | | 62/335 |
| 6,574,978 B2 | 6/2003 | Flynn et al. | |
| 7,526,924 B2 * | 5/2009 | Wakamoto | F25B 13/00 |
| | | | 62/175 |
| 9,239,174 B2 * | 1/2016 | Rockenfeller | F25B 7/00 |
| 9,989,280 B2 | 6/2018 | Ali | |
| 10,077,924 B2 * | 9/2018 | Takayama | F25D 21/002 |
| 10,465,968 B2 * | 11/2019 | Takenaka | F25B 13/00 |
| 2015/0176866 A1 | 6/2015 | Takayama et al. | |

* cited by examiner

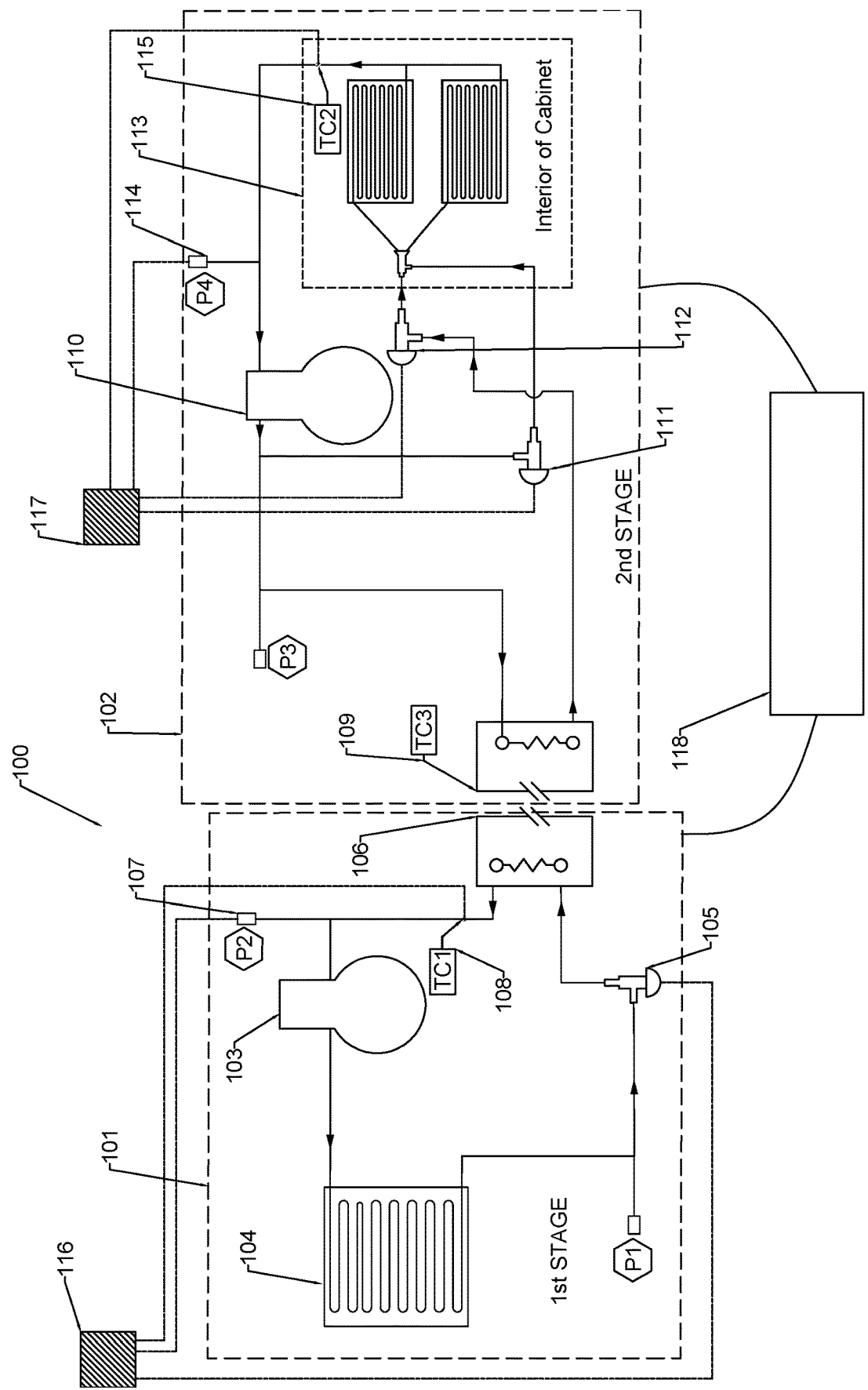

SYSTEM AND METHOD OF HOT GAS DEFROST CONTROL FOR MULTISTAGE CASCADE REFRIGERATION SYSTEM

CROSS REFERENCE TO RELATED APPLICATIONS

The present application claims priority to U.S. Provisional Application No. 62/857,047, filed Jun. 4, 2019, which is incorporated herein by reference in its entirety.

FIELD OF THE INVENTION

The present invention relates to refrigeration systems and, in particular, to an improved multistage, cascade refrigeration system which provides greater defrost flexibility with increased ease of design and implementation compared to current refrigeration systems.

BACKGROUND

Multistage, cascade refrigeration systems generally consist of two complete refrigeration circuits that are linked through a heat exchanger. The higher temperature system, or first stage, will have an air-cooled or water-cooled condenser, a compressor and an evaporator that is part of the central heat exchanger. The lower temperature system, or second stage, will have an evaporator in an accessible insulated cabinet space, a compressor, and a condenser that is part of the central heat exchanger. Both stages contain throttles for expansion of refrigerant, and the two systems, along with various other components, work together to pass energy from the second stage evaporator through the central heat exchanger and out to the external environment through the first stage condenser. Interfacing with the unit by opening the insulated cabinet space will introduce moisture via the air that will eventually cause frost and ice to build up on the evaporator coil. This build-up of ice must be defrosted and removed to maintain performance of the refrigeration system.

Existing methods for achieving a complete coil defrost in a multistage, cascade system usually include electric resistance heating rods and/or hot gas bypass. The electric heaters usually require evaporator coil designs to have open tubes for the insertion of the rod heaters and incorporate some form of control utilizing temperature sensing, relays etc. This type of defrost doesn't require either first or second stage refrigeration systems to run. Although robust, should a design require more evaporator coil capacity, the tubes being used for the heater rods may not be available. In such an instance, hot gas defrost may be implemented.

When using hot gas bypass to defrost, the hot gas used to melt the ice comes from the high temperature compressed refrigerant of the second stage that is supplied to the evaporator coil. This gas bypasses its condenser and the heat exchanger that exists between the stages. A problem with usual hot gas defrost methodologies is the difficulty involved with the control of temperatures and refrigerant flow during the defrost process. In order to maintain favorable compressor conditions in the second stage, the temperature of the heat exchanger between the stages is ideally kept constant. This traditionally is maintained by blending first stage hot gas bypass with the constant flow of liquid refrigerant that is coming through the liquid expansion device of the first stage. A solenoid actuated hot gas valve opens, and through a specifically sized orifice, allows the flow of hot gas to enter the liquid stream. The liquid stream, when controlled through traditional expansion devices such as capillary tubes and thermostatic expansion valves, is always present due to their design having an orifice that is always open. This blend of expanded liquid refrigerant and the short-cycled hot gas is hard to achieve, can require several iterations, and is restricted to one set of environmental conditions to work.

Maintaining the temperature of the heat exchanger can require, for example, adjustment to the orifice sizes, adjustment to refrigerant charge, and subsequent testing in different ambient temperatures. If these variables are not accounted for, the temperature of the heat exchanger can become too cold or too hot; in one instance making for a poorly performing second stage defrost cycle, and in another instance a defrost cycle that damages the second stage compressor due to high temperatures and pressures.

While existing methodologies may be suitable for laboratory or other thermally stable environments, they are not suitable for industrial applications where temperatures may vary from near 0° C. to 35° C. or higher. There exists a need, therefore, for a multistage refrigeration system that overcomes the shortcomings of the prior art. In these more extreme conditions, the present invention separates itself from the conventional designs. It accounts for these variables by removing the variability of blended liquid refrigerant and hot gas mixtures by utilizing more advanced liquid refrigerant expansion devices such as pulse width modulating (PWM) and stepper valves which can be fully closed to prevent the flow of refrigerant among other things to be described in greater detail later.

SUMMARY OF THE INVENTION

The present invention fulfills this need by removing the variability of blended liquid refrigerant and hot gas mixtures by utilizing more advanced liquid refrigerant expansion devices, which include, without limitation, PWM and stepper valves which can be fully closed to prevent the flow of refrigerant. Thus, the present invention provides an improved system and method for hot gas defrost control for multistage, cascade refrigeration systems which, in contrast to existing methods and designs of hot gas defrost systems in multistage refrigeration systems, can defrost an evaporator coil with greater flexibility and increased ease of design and implementation while maintaining air in the evaporator coil below the freezing point of water.

In an aspect of the invention, there is provided an improved system of hot gas defrost for a multistage, cascade refrigeration system. The multistage cascade system is comprised of a first stage and a second stage, with the improved system of hot gas defrost comprising a first stage liquid expansion valve; a second stage liquid expansion valve; a second stage hot gas valve; a superheat board in the first stage for monitoring pressures and temperatures in the first stage, and a superheat board in the second stage for monitoring pressures and temperatures in the second stage, wherein the superheat board in the first stage also controls refrigerant flow in the first stage liquid expansion valve, and the superheat board in the second stage controls refrigerant flow in the second stage for hot gas and liquid expansion valves. The multistage cascade system also contains a system controller comprised of a plurality of electronic components, a compressor, a central heat exchanger, temperature sensing devices, pressure sensing devices, a condenser for the first stage, and an evaporator coil enclosure for the second stage.

In another aspect of the invention, there is provided an improved method for hot gas defrost for a multistage, cascade refrigeration system, in which the multistage, cascade system is comprised of a first stage and a second stage. The method is comprised of the steps of monitoring the pressures and temperatures of the first and second stages by first and second stage superheat boards, respectively, the first and second stage superheat boards also controlling refrigerant flow of first and second stage liquid expansion valves, respectively, and the second stage superheat board also controlling a second stage hot gas valve; having a system controller also controlling the functions of the first and second stages, the first and second stages each having a compressor which provides mass flow and pressure differential of the system. The method further comprises, in the first stage, producing a superheated vapor by the compressor, cooling and condensing the superheated vapor to a liquid in a condenser, expanding the liquid through the first stage liquid expansion valve, having the expanded liquid absorbing energy from a central heat exchanger, returning the expanded liquid to the compressor as superheated vapor, and having the second stage operate the same as the first stage, except that the expanded liquid refrigerant in the second stage moves to an evaporator coil enclosure where energy is absorbed.

In an embodiment, the first and second liquid expansion valves and the second stage hot gas valve may include, without limitation, PVM valves.

The temperature sensing device may include, without limitation, thermocouples (TCs) or a resistance temperature detector (RTD). The pressure sensing device may include, without limitation, a pressure transducer.

The present invention allows for more robust hot gas defrost function for multistage refrigeration systems, such that it is unaffected by temperature changes of the condensing fluid (ambient air temperature for air cooled condensers, water temperature for water cooled condensers), and can be readily adapted to any refrigerant suitable for a selected temperature range. This is done by using the principles of saturated temperature and pressure, and by using the properties of one refrigerant to impose conditions on another through a heat exchanger between the fluids.

The invention includes the use of electronically controlled liquid refrigerant expansion devices capable of being fully closed in both the first and second stages. The second stage also has an additional electronically-controlled refrigerant metering device for the uncondensed hot gas used in the defrost process. The expansion valves, which include, without limitation, PWM valves, are controlled by circuit boards, also referred to as superheat boards, whose inputs are pressures and temperatures from specific locations in the system. The circuit boards also control the function of the expansion valves during the defrost operation, which begins by turning off the first stage compressor. When disengaged, the pressure differential in the first stage circuit equalizes through the electronically controlled expansion valve until a predetermined pressure is achieved. When the predetermined pressure is detected, the valve is closed, isolating the central heat exchanger in the system and maintaining the pressure therein. It is this point of pressure and temperature of the first stage refrigerant that sets the temperature for the heat exchanger and allows the hot gas performance of the second stage to remain constant no matter the external conditions. Simultaneous to shutting off the first stage compressor, the second stage liquid expansion valve also is closed by the superheat board, and the electronically controlled hot gas expansion valve is opened to allow the bypassing of refrigerant around the central heat exchanger and directly to the evaporator. The compressor suction pressure is monitored and the valve is modulated by the superheat board such that the pressure is kept close to constant.

BRIEF DESCRIPTION OF THE DRAWINGS

For the present disclosure to be easily understood and readily practiced, the present disclosure will now be described for purposes of illustration and not limitation in connection with the following FIGURE, wherein:

FIG. 1 depicts one potential embodiment of a multistage, cascade refrigeration system of the present invention, containing two refrigeration systems linked through a central heat exchanger, a system controller, and superheat control boards.

DETAILED DESCRIPTION OF THE INVENTION

The present invention is not limited in application by the use of specific components outlined in the following descriptions or drawing as there may be various methods of control and refrigerant valving in many different embodiments. The terminology utilized throughout this description should also be understood to not be limiting, as it is only intended to be used in the efforts of describing the operation of the system and methodology.

The present invention relates generally to the function and ability of a refrigeration system using hot gas defrost to rid the evaporator coil enclosure of ice build-up which accumulates over time, while the air in the evaporator coil enclosure remains below the freezing point of water. This is especially important for systems whose operating temperatures require multiple refrigerants and refrigeration systems to achieve the desired temperatures, usually below −40° C. At these extreme temperatures, defrosting the evaporator coil can be quite difficult.

Referring now to FIG. 1, which illustrates an overview of an embodiment of the multistage, cascade refrigeration system (100) of the present invention, in the depicted embodiment, the first stage system (101) suction pressure transducer (107) and second stage (102) suction pressure transducer (114), as well as the suction line temperatures of the first stage (108) and second stage (115) are monitored and act as inputs to the controlling functions provided by the superheat boards (116, 117). The superheat boards SB-1 and SB-2 respectively (116, 117), in turn, control the electronic liquid refrigerant expansion control valves, such as, for example PWM valves, in their respective stages. SB-1 (116) controls the refrigerant flow of the first stage liquid expansion PWM valve (105). SB-2 (117) controls the refrigerant flow of the second stage liquid expansion PWM valve (112) and the second stage hot gas PWM valve (111). Beyond the refrigerant flow control capabilities, the first stage system is controlled by an overall system controller (118) which can be any number of possible control configurations using relays, contactors, PLC's, and other technologies commonly known by those skilled in the art. The first stage system has a compressor (103) which provides the mass flow and pressure differential of the system. The compressed superheated vapor produced by the compressor is cooled and condensed to liquid in the condenser (104) before that liquid is expanded through the PWM valve (105). The expanded refrigerant then absorbs energy from the central heat exchanger (106) and returns to the compressor as superheated vapor. The second stage operates similarly, using the system controller (118) to start and stop its functions and components, including the compressor (110). The compressed superheated gas from the compressor is cooled and condensed in the central heat exchanger (106), whose overall temperature is monitored by a temperature sensing device (109), which could include but is not limited to thermocouples (TC) and resistance temperature detector (RTD). The cooled liquid is expanded through the liquid expansion PWM valve (112) and moves to the evaporator housing (113) where energy is absorbed. The hot gas PWM valve (111) controls the flow of superheated vapor from the compressor to the evaporator coil enclosure (113) during a hot gas defrost cycle.

The initialization of the hot gas defrost cycle on an evaporator coil (113) can be done through several methods including, but not limited to, a timer where a period is chosen, or other more robust and active methodologies utilizing the information and data sent to the system controller (118). This information can include, but is not limited to, data such as suction pressure, suction temperature, PWM duty cycle, quantity of door openings recorded from switches, along with other performance factors such as compressor cycle rate. The data is then analyzed through various conditions and algorithms in the system controller (118), which can determine when a defrost cycle is required.

The design phase of the hot gas system of the present invention includes an in-depth analysis of the refrigeration properties of the refrigerants chosen for the application. The principles of saturated temperature and pressure are at the core of the present invention, utilizing the principles of the Ideal Gas Law and the thermodynamic properties of pressure and enthalpy, such as is described in refrigerant P-H diagrams and tables common to those skilled in the art. Using the refrigerant properties data, the refrigerants of the first and second stage are analyzed, and a temperature stability point is targeted, such that the same temperature results in desirable pressures for each refrigerant.

EXAMPLE

The present invention is more particularly described in the following non-limiting example, which is intended to be illustrative only, as numerous modifications and variations therein will be apparent to those skilled in the art.

Example—Hot Gas Defrost Cycle Operation

In this example, refrigerant R-404a is used in the first stage, and refrigerant R-508B is used in the second stage, given a design criterion where a refrigeration system must operate at −80° C. in the evaporator enclosure. As during normal operating conditions, the compressor operating conditions during defrost are critical to performance and longevity. As such, operational limits exist to which we must adhere. The upper limit of compressor operation can vary but is generally set by compressor manufacturers and industry experts to be 300PSIA of discharge pressure and a compression ratio of around 10:1 between suction pressure and discharge pressure. If operating at 300PSIA, any liquid R-508B that exists in the central heat exchanger, would be at a saturation temperature of almost −11° C. The lower limit of compressor operation exists only in the form of how quickly and efficiently we would like the hot gas defrost to operate. Product testing has indicated this defrost cycle discharge pressure to be about 200 PSIA of R-508B, yielding a saturation temperature of about −25° C.

This target temperature range for the R-508B, as defined by its refrigerant properties, becomes congruent with the desired temperature of the entire central heat exchanger, and it must be maintained within the given temperature window of −11° to −25° C. for a proper defrost to occur on the second stage. Targeting a temperature in the middle of the range, such as −16° C., and using the same principles of saturated temperature and pressure, the first stage refrigerant is analyzed. At −16° C., R-404 has a saturation pressure of about 50 PSIA. When the defrost cycle is initiated, the system controller turns off the first stage compressor and allows the pressure to equalize through the PWM valve. The superheat board monitors the first stage suction pressure transducer and closes the first stage PWM valve when the defined 50PSIA suction pressure is reached. By maintaining the pressure of R-404A in the central heat exchanger, the pool of liquid refrigerant becomes a maintained mass, stabilizing its temperature around the targeted −16° C. The temperature of the central heat exchanger is measured by a temperature sensing device, and monitored by the system controller.

With the temperature of the central heat exchanger defined by first stage suction pressure of 50PSIA and −16° C., that same temperature correlates to the discharge pressure for the second stage system. When the temperature increases, the second stage discharge pressure rises and when the temperature decreases, the discharge pressure also decreases, following the principles of the Ideal Gas Law. When the second stage refrigerant R-508B is saturated at −16° C., the corresponding pressure is about 260PSIA, which is less than the defined 300PSIA maximum. When a hot gas defrost is called for by the refrigeration system controller, the second stage compressor continues to run, the second stage superheat board closes the liquid expansion PWM valve and begins controlling the hot gas PWM valve. During the hot gas cycle, the second superheat board monitors the second stage suction pressure transducer, and uses that input to modulate the second stage hot gas PWM valve. Keeping in mind the desired compression ratio limit of 10:1 and 300PSIA maximum discharge pressure, the targeted suction pressure is set at 30PSIA and is controlled by the modulation of the hot gas PWM valve. This modulation continues throughout the cycle, continually targeting 30PSIA suction pressure, allowing for safe operation of the second stage compressor, and eliminating the need for a separate crankcase pressure regulator (CPR) valve and other hardware common to those skilled in the art.

The first stage suction pressure will continue to be maintained and the second stage compressor will continue to run throughout the defrost process. Typical temperature measurement methods such as RTD's and TC's will act as inputs to the controller, signaling when the evaporator coil has become adequately defrosted, triggering the end of the defrost cycle. Should the temperature of the central heat exchanger rise to a point outside the defined operating limit of −11° C., the controller will re-engage the first stage compressor the super heat board will begin controlling the first PWM for liquid again, and the system will pull the central heat exchanger temperature back down to the defined set point of −16° C. Once reached, the compressor will once again shut off and the PWM valve will again allow pressure to equalize until it reaches the defined 50PSIA set point. The first stage PWM will again be closed by the first superheat board and the pressure maintained to stabilize the heat exchanger. In such an event, as the temperature approaches −11° C., the discharge pressure of the second stage would continue to climb towards our upper limit of 300PSIA. When the temperature is brought back down to −16° C. or colder, the pressure in the second stage will also drop back into the middle of the operating range.

The operating conditions used in this example would change with different selections of refrigerants in either the first or second stages of the system, due to the change of the refrigerant properties and points of saturated temperature and pressure. With correct operating conditions however, this methodology would be valid for any suitable hydrofluorocarbon (HFC) or hydrocarbon (HC) refrigerants chosen in a multistage, cascade refrigeration system.

While the invention has been particularly shown and described with reference to embodiments described above, it will be understood by those skilled in the art that various alterations in form and detail may be made therein without departing from the spirit and scope of the invention, as defined by the appended claims.

What is claimed is:

1. An improved system of hot gas defrost for a multistage, cascade refrigeration system, said multistage cascade system comprised of a first stage and a second stage, said improved system of hot gas defrost function comprising:
    a first stage liquid expansion valve;
    a second stage liquid expansion valve;
    a second stage hot gas valve;
    a central heat exchanger;
    a compressor for each of the first and the second stage liquid expansion valves;
    temperature sensors;
    pressure sensors;
    a system controller comprised of a plurality of electronic components, said system controller maintaining temperature of the central heat exchanger;
    a second stage evaporator coil enclosure;
    a first stage superheat board for monitoring pressures and temperatures in the first stage, said first stage superheat board also controlling refrigerant flow in the first stage liquid expansion valve; and
    a second stage superheat board for monitoring pressures and temperatures in the second stage, said superheat board in the second stage also controlling refrigerant flow in the second stage liquid expansion valve, wherein the system controller shuts off the first stage compressor during the hot gas defrost, wherein the first stage superheat board fully closes the first stage liquid expansion valve to stop flow of refrigerant into the central heat exchanger so that low pressure and temperature of refrigerant in the central heat exchanger is maintained, wherein the second stage superheat board fully closes the second stage liquid expansion valve to stop flow of superheated refrigerant into the central heat exchanger so that temperature of the central heat exchanger is maintained and simultaneously opens the second stage hot gas valve which allows the refrigerant to bypass the central heat exchanger and flow directly to an evaporator coil enclosure where energy is released, wherein performance of the hot gas defrost of the second stage is consistent during the defrost regardless of external conditions.

2. The improved system of claim 1, wherein the first and second liquid expansion valves and the second stage hot gas valve are pulse width modulating (PWM) valves.

3. The improved system of claim 1, wherein the system controller engages the compressors to provide mass flow and pressure differential in the first and second stages.

4. The improved system of claim 2, wherein the mass flow and pressure differential in the first stage is achieved by compressed superheated vapor produced by the first stage compressor which then is cooled and condensed to liquid in the condenser prior to said liquid being expanded through a PWM valve.

5. The improved system of claim 1, wherein the temperature sensors comprise thermocouples or a resistance temperature detector.

6. The improved system of claim 4, wherein the expanded liquid refrigerant absorbs energy from the central heat exchanger and returns to the first stage compressor as superheated vapor.

7. The improved system of claim 5, wherein in the second stage, compressed superheated vapor from the second stage compressor is cooled and condensed in the central heat exchanger, is expanded in the second stage liquid expansion PWM valve, and the expanded liquid refrigerant moves to the evaporator coil enclosure where energy is absorbed.

8. The improved system of claim 7, wherein the second stage superheat board controls the hot gas valve.

9. The improved system of claim 8, wherein initialization of the hot gas defrost cycle is achieved by using a timer where a time period is chosen, or by using information and data sent to the system controller.

10. The improved system of claim 9, wherein the information sent to the system controller comprises data selected from suction pressure, suction temperature, PWM duty cycle, quantity of door openings recorded from switches or compressor cycle rate.

11. The improved system of claim 10, wherein the system controller determines when a defrost cycle is required.

12. An improved method for hot gas defrost for a multistage, cascade refrigeration system, said multistage, cascade system comprised of a first stage and a second stage, said improved method comprising:
    monitoring the pressures and temperatures of the first stage and the second stage by a first stage superheat board and a second stage superheat board, respectively, said first and second stage superheat boards also controlling refrigerant flow in first stage and second stage liquid expansion valves, respectively, said second stage superheat board also controlling a second stage hot gas valve;
    having a system controller control functioning of said first and second stages, each of said first and second stages having a first stage and a second stage compressor, respectively, which provides the mass flow and pressure differential of the system;
    wherein the system controller shuts off the first stage compressor during the hot gas defrost, wherein the first stage superheat board fully closes the first stage liquid expansion valve to stop flow of refrigerant into the central heat exchanger so that low pressure and temperature of refrigerant in the central heat exchanger is maintained, wherein the second stage superheat board fully closes the second stage liquid expansion valve to stop flow of superheated refrigerant into the central heat exchanger so that temperature of the central heat exchanger is maintained and simultaneously opens the second stage hot gas valve which allows the refrigerant to bypass the central heat exchanger and flow directly to an evaporator coil enclosure where energy is released, wherein performance of the hot gas defrost of the second stage is consistent during the defrost regardless of external conditions.

13. The improved method of claim 12, wherein the first and second liquid expansion valves and the second stage hot gas valve are pulse width modulating PWM valves.

14. The improved method of claim 12, wherein in the first and second stages, the superheated vapor refrigerant is monitored by pressure transducers and temperature sensors during its return to the compressors.

15. The improved method of claim 14, wherein the temperature sensors comprise thermocouples or a resistance temperature detector.

16. The improved method of claim 12, wherein the second stage hot gas valve controls the flow of superheated vapor from the compressor to the evaporator coil enclosure during a hot gas defrost cycle.

17. The improved method of claim 16, wherein initialization of the hot gas defrost cycle is achieved by using a timer whereby a time period is chosen, or by using information and data sent to the system controller.

18. The improved method of claim 17, wherein the information sent to the system controller comprises data selected from suction pressure data, suction temperature, PWM duty cycle, quantity of door openings recorded from switches, or compressor cycle rate.

19. The improved method of claim 18, wherein the system controller determines when a defrost cycle is required.

20. The improved method of claim 19, further comprising:
   having the system controller analyze refrigerant properties data of refrigerants used in the first and second stages; and
   targeting a temperature stability point of the central heat exchanger so that the same temperature results in desirable pressures for each refrigerant during defrost.

* * * * *